May 24, 1938.　　　　S. L. LEBBY　　　　2,118,709
SIGNAL
Filed Dec. 9, 1932

INVENTOR.
STATES LEE LEBBY
BY Dorsey & Cole
ATTORNEYS.

Patented May 24, 1938

2,118,709

UNITED STATES PATENT OFFICE 2,118,709

SIGNAL

States Lee Lebby, Corning, N. Y., assignor to Corning Glass Works, Corning, N. Y., a corporation of New York Application December 9, 1932, Serial No. 646,555

3 Claims. (Cl. 177—329)

This invention relates to signals and more particularly to those used for indicating the approach of a train at highway crossings. Such signals usually comprise two light projecting units mounted side by side and a short distance apart so as to project a light signal in the direction of approaching vehicles. These light units are usually arranged with suitable switching means or relays which operate in such a way that the lights alternately flash on and off, giving the effect of the so-called wig-wag signal or swinging light.

In order to cover a sufficiently wide angle of approach it has been found desirable to spread the beam of light from the projector units heretofore used in this type of signal and in some instances the signal is required to produce an indication through a total 360° angle. The amount of energy necessary to produce an adequate light signal indication through such a wide angle is comparatively large and, consequently, such signals are costly to operate.

It is an object of this invention to produce a signal through the entire 360° angle or as large a portion thereof as may be desired and yet utilize a minimum amount of energy.

Another object is to simplify the operating mechanism for such signals by eliminating relays and moving contacting devices of all kinds.

A further object is to assure a positive early indication down the roadway so that an approaching vehicle will promptly receive notice of the approach of the train.

I have found that by using powerful projectors and revolving them a powerful flashing signal having the same characteristics as that of the swinging light may be produced. To accomplish this two projector units are mounted to rotate on parallel axes a short distance apart and are geared together so that when the beam from one projector is in one direction, the beam from the other projector is in the opposite direction. By thus synchronizing movements of the projector units, alternate flashes of uniform duration are produced at any point about the signal while the latter is in operation. In this manner, I obtain alternately flashing signals of high intensity without interrupting the flow of current through the light source and hence failures through the sticking of relays and like mechanisms are eliminated. Moreover, a signal of this type is extremely economical of operation since instead of requiring sufficient energy to produce an effective beam throughout a spread of 360° I find that by revolving the projector I can cover the entire 360° angle with a beam of approximately 7° spread. It is, therefore, a matter of simple calculations to find that the intensity of the signal would be increased approximately fifty times, assuming that the same amount of light is projected in each case. Deducting the energy required to revolve the projectors, I find the increase in signal strength to be about 25 to 1. In order to assure the early transmission of a positive indication to an approaching vehicle at all times and under all conditions, I provide means for bringing the mechanism to rest in a predetermined position or so that the light beam from the projectors will be initially projected down the roadway.

Figure 1:
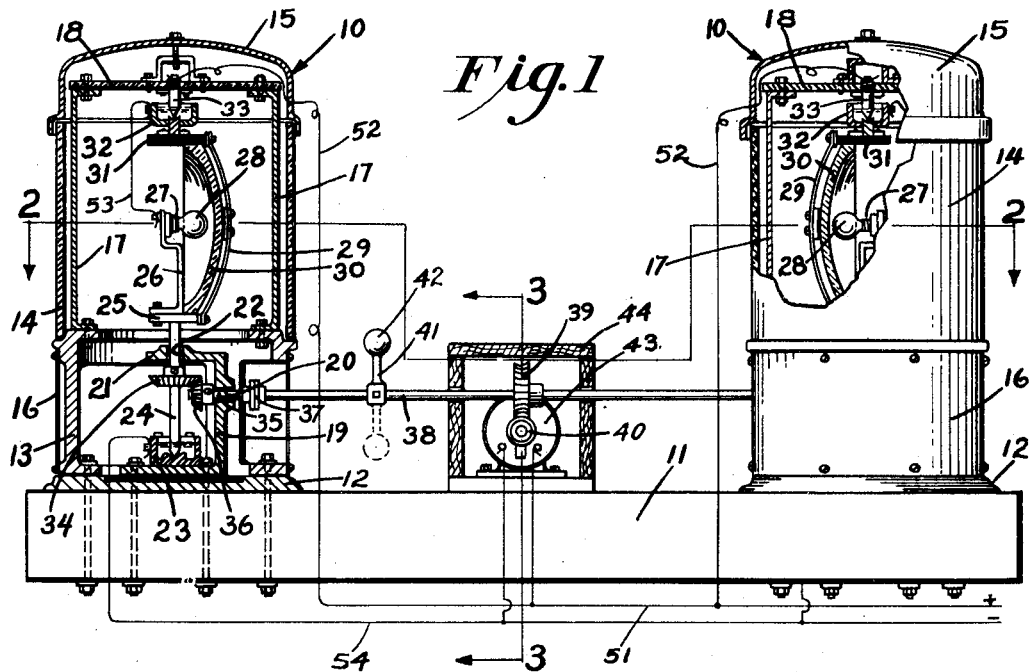
Fig. 1 is a side view of my improved signal showing portions of it in section to more clearly illustrate the details of construction.

Referring to the drawing in detail, my improved signal comprises a pair of lamps 10 which are identical in construction and mounted at opposite ends of a suitable support 11. Each lamp 10 comprises a base plate 12 to which is attached a spider 13 upon which is supported a glass cylinder 14 which may be clear or colored as the service may demand. Surmounting the upper end of the cylinder 14 is a cap 15 and secured to the exterior of the spider 13 is a cylindrical shell 16. Secured to and extending upwardly from the upper end of the spider 13 are standards 17 which support at their upper ends a disk 18 of insulating material and supported by but insulated from the base plate 12 is a bracket 19 having in its vertically extending leg an opening 20. The upper end of the bracket 19 is provided with a horizontally extending arm 21 which like the vertically extending leg is provided with an opening 22.

Secured to the base of the bracket 19 in vertical alignment with the opening 22 is a cup 23 of conducting material which contains metallic mercury and seated in a bearing formed centrally of said cup is a vertically extending shaft 24 which extends through the opening 22 and carries at its upper end a disk 25. Attached to the disk 25 is a bracket 26 which supports at its upper end a lamp socket 27 in which an incandescent electric lamp 28 is supported. Supported in a suitable holder 29 carried by the disk 25 is a projector 30 which in the present example is shown as a catadioptric projection mirror and the projector 30 and lamp 28 are so related that the filament of the lamp is at the focus of the projector. Secured to the holder 29 at the upper edge of the projector 30 is a disk 31 of insulating material and carried by this disk is a cup 32 which like the cup 23 contains metallic mercury and is provided with a central bearing into which the pointed end of a stub shaft 33 projects. This stub shaft is secured to and supported by the insulating disk 18 previously mentioned and cooperates through the bearing carried by the cup 32 with the bearing carried by the cup 23 in maintaining the shaft 24 and the mechanism supported thereon in vertical position.

Attached to the shaft 24 immediately below the arm 21 is a bevel pinion 34 and mounted for rotation in the opening 20 of the bracket 19 is a shaft 35 to the inner end of which is secured a bevel pinion 36 which meshes with the bevel pinion 34 above described. The opposite end of the shaft 35 is provided with an insulating coupling 37 by means of which a drive shaft 38 is connected to the shaft 35. Attached to the drive shaft 38 intermediate its ends is a worm gear 39 which under certain conditions meshes with a worm 40 which is mounted on one end of the shaft of a motor to be more fully hereinafter described. Adjustably attached to any suitable point to the drive shaft 38 is an arm 41 carrying at its free end a weight 42, the purpose of which will appear as the description proceeds.

Figure 3:
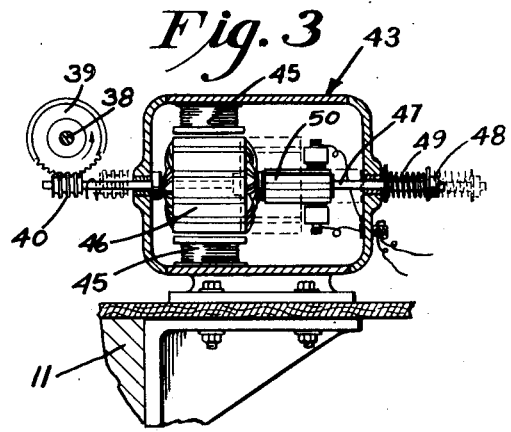
Fig. 3 is a vertical sectional view taken on the line 3—3 of Fig. 1.

The drive motor 43 above referred to is attached to the support 11 at any suitable point intermediate its ends and is preferably enclosed in a housing 44 to exclude rain, dust, and the like. This motor is provided with the usual field magnets 45 within which the usual armature 46 is rotatably mounted. The motor shaft 47 upon which the armature is supported unlike the usual motor shaft is of a length somewhat in excess of the motor housing. This shaft carries at one end the worm 40 above described and has attached to its opposite end a collar 48 which serves as an abutment against which one end of a coiled compression spring 49 presses. The opposite end of the spring 49 abuts the motor frame so that the shaft 47 is held in retracted (dotted line) position as illustrated in Fig. 3 until the field magnets 45 are energized. The usual commutator in this motor is replaced by an extra long commutator 50 so that regardless of the position of the shaft 47, it will always contact with the motor brushes.

Figure 2:
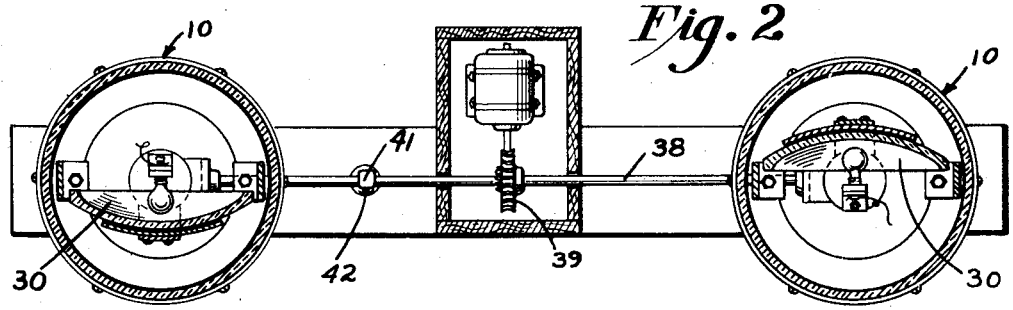
Fig. 2 is a horizontal sectional view taken on the line 2—2 of Fig. 1.

As shown in Figs. 1 and 2, the projectors 30 of the lamps 10 are arranged so that when one is facing in one direction, the other will face in the opposite direction. In other words, the beams projected by the projectors are exactly one hundred eighty (180°) degrees apart. It will thus be seen that when the lamp bulbs 28 are lighted and the shaft 38 is being rotated the projectors will be revolved in such a manner as to produce an alternately flashing signal regardless of the position from which it is viewed and that from any point from which both lamps are visible the effect of a wig-wag signal is obtained.

The operation of the signal is controlled by the usual track mechanism and when it is in circuit, the current flows through a lead 51 to one side of the motor 43 and simultaneously through leads 52 to the stub shafts 33 of the lamps 10 from which it flows through the cups 33 and leads 53 to one side of each lamp bulb 28. Passing through the lamp bulbs, the current is returned to a lead 54 through the bracket 26, shafts 24 and cups 23.

In operation, current flowing through the leads 51 and 54 will enter the field magnets 45 of the motor, thus energizing them and causing the armature 46 to move against the compression of the spring 49 into the full line position shown in Fig. 3. This movement of the armature coupled with its simultaneous rotation causes the worm 40 to mesh with the worm gear 39 and impart rotation to the drive shaft 38. The rotation of the drive shaft will be imparted through the couplings 37 to the shafts 35 and cause the bevel pinions 36 to drive the bevel pinions 34 and thus impart rotary motion to the shafts 24 and the projectors supported thereby. Simultaneously, with the energizing of the motor the lamps 28 are lighted and the beams produced by the projectors move in a three hundred sixty (360°) degree sweep so as to produce alternating powerful flashes from any position from which the signal is viewed. As soon as the current is discontinued, the lights are extinguished and the field magnets 45 are deenergized. This allows the shaft 47 to move into the dotted line position shown in Fig. 3 under the influence of the spring 49, thus disengaging the worm 40 from the worm gear 39. Such disengagement frees the shaft 38 so that the weight 42 may drop into the dotted line position shown in Fig. 1 and bring the projectors 30 to rest in such a position that a beam produced by them will be parallel to the path normally taken by one approaching the signal. This feature adds to the safety of the signal and is incorporated to take care of an emergency such as failure of the motor 43 to operate and also to insure that the earliest indication will be produced in the direction desired. In such a case, the beams projected would effectively produce a signal though the alternate flashing feature might be absent.

While in the foregoing there has been shown and described the preferred embodiment of my invention, it is to be understood that minor changes in the details of construction, combination and arrangement of parts may be resorted to without departing from the spirit and scope of the invention as claimed.

What I claim is:

1. In combination with a railway crossing signaling unit comprising a pair of rotatable projectors normally in positions to project light beams toward a highway, a drive shaft for rotating said projectors, a motor comprising a field coil and an armature slidable into and out of alinement with the field coil, means drivably engaging the armature with the drive shaft when the armature is in alinement with the field coil and disengaging the armature from the drive shaft when the armature is out of alinement with the field coil, means for moving the armature out of alinement with the field coil when no current is flowing through the latter, and means for effecting the rotation of said projectors to their initial positions whenever said armature becomes disengaged from said drive shaft.

2. In a railway crossing signal, a pair of beam projecting means including incandescent lamps normally in positions to project light beams toward a highway, a drive shaft for driving said beam projecting means simultaneously about parallel axes, a motor for driving said shaft including a field coil and an armature slidable into and out of alinement with the field coil and adapted when in the former position to drive said shaft and when in the latter position to be disengaged from driving relation with said shaft, means for causing said projecting means to assume its normal position whenever said shaft becomes disengaged from driving relation with said armature, and a circuit including said lamps and field coil whereby when current is flowing through said circuit said lamps are lighted and said field coil energized to move said armature into position for driving said shaft and when no current is flowing in said circuit said lamps are extinguished and said field coil deenergized to allow said armature to be moved out of driving position with reference to said shaft.

3. In combination, a railway crossing signaling unit comprising a pair of rotatable projectors normally in position to direct light beams toward a highway, a drive shaft for rotating said projectors, a motor having means associated therewith operated in response to its energization to drivably engage said shaft whereby to simultaneously rotate said projectors, and means for effecting the rotation of said projectors to their initial position whenever said motor becomes deenergized.

STATES LEE LEBBY.